July 7, 1936.   W. RUNGE   2,046,850
METHOD OF MARKING TRAVELING LANES BY MEANS OF ELECTROMAGNETIC WAVES
Filed July 17, 1935
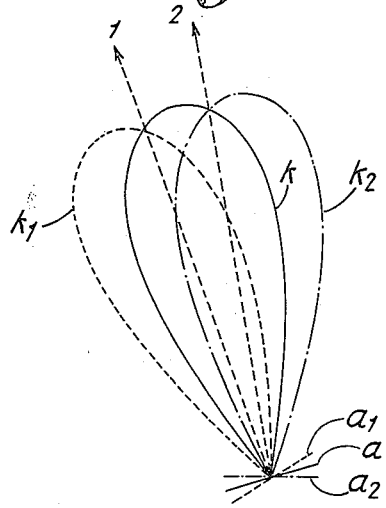
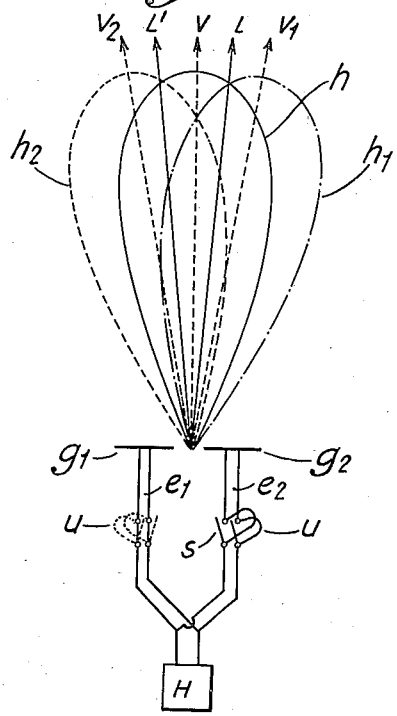
INVENTOR
WILHELM RUNGE
BY
ATTORNEY Patented July 7, 1936

2,046,850

UNITED STATES PATENT OFFICE 2,046,850

METHOD OF MARKING TRAVELING LANES BY MEANS OF ELECTROMAGNETIC WAVES

Wilhelm Runge, Berlin, Germany, assignor to Telefunken Gesellschaft fur Drahtlose Telegraphie m. b. H., Berlin, Germany, a corporation of Germany Application July 17, 1935, Serial No. 31,816
In Germany July 5, 1934

3 Claims. (Cl. 250—11)

The present invention relates to a method of and means for marking and identifying traveling lanes by means of electromagnetic waves.

In weather of low visibility traveling lanes must be marked by means of electro-magnetic waves instead of optical signals, for the purpose of guiding marine and air craft and the like. As can be seen from sea maps, a traveling lane is generally not marked by a line but rather by a more or less wide sector. If radio beacons are to be, as a matter of fact, a full equivalent of and substitute for optical signaling, such radio beacons must outline a sector just as an optical method or means as represented by light-houses or other light beacons would do. Radio beacon equipments of the kind heretofore used, however, are unable to measure up to this demand.

In order to guide or pilot craft, recourse has heretofore been had to two methods. In one, a so-called course bearing is fixed. With this end in view two radiations or beams are sent out which partially over-lap. The zone in which both beams produce approximately equal signal strength is what is called the guide line. As the name correctly implies this is a line, and a mere line cannot answer the above requirements. The other method consists in sending out a beam which is confined to the zone inside the desired sector. In this connection the following short comings have been observed: It is generally not possible to concentrate the beam in such a way that radiations will be sent out only inside a single sector. On the contrary it is known that when the beam is highly concentrated stray radiations are produced which are conducive to ambiguity. The demand to concentrate the chief radiations to a sector of a few degrees of angle presupposes the use of complicated antenna and reflector equipment of considerable size, and this impairs the chances of regulating such arrangements.

According to the invention, the marking of lanes of travel by means of electro-magnetic waves is effected by causing a guide beam to occupy periodically different positions, or by fixing the lateral boundary lines of a sector by two guide lines. In order to carry the basic idea of the invention into practice means are disclosed which are extremely simple and adaptable to widely varying working demands.

In what follows a number of exemplified embodiments of the idea underlying the invention shall be described in more detail by reference to the attached drawing wherein:

Figs. 1 and 2 are explanatory of the principles of the invention.

In Fig. 1 the boundary lines of the sector to be marked are denoted by 1 and 2. Each of the two lines according to the invention is fixed by a guide ray. Such a "guide-ray", as known, requires the transmission of two fields which partly overlap and which often are transmitted at a complementary signal rhythm in such a way that inside the guide ray or course-bearing a permanent signal or a similar characteristic signal is received. However, the two radiations could be given other identification marks which result in a characteristic signal inside the guide line. For the sake of completeness it may be mentioned that the two beams could be characterized by modulation with different frequencies. For fixing two guide lines it is by no means necessary to provide four alternately keyed or modulated radiators. Referring to Fig. 1 the assumption is made that two radiators $a$—1 and $a$—2 are provided which send out beams $k$—1 and $k$—2 and which are keyed at different rhythms.

By suitable choice of the signal sequence in the different radiations or beams, as is well known, conditions can be so made that both the two guide lines are accurately perceivable while it is also possible to tell therefrom whether the receiver is located inside the desired sector or outside of it, and in the latter case upon which side of it.

The arrangement may be still further simplified by using, for marking a course-bearing, only a single antenna comprising a plurality of radiators which consists of groups of radiators fed at different phase relations.

Referring to Fig. 2 $g$—1, $g$—2 each denotes such a group of radiators. In the simplest case each group comprises a single dipole; for practical purposes, however, each group would conveniently consist of several regularly arranged dipoles ("Christmas tree" type of antenna). If both groups are fed at equal phases through the same feeder leads $e$—1, $e$—2, there results a diagram which is indicated by curve $h$. The main radiation vector $v$ is at right angles to the antenna surface. But if one group is fed with energy presenting a phase shift in reference to the other, then the diagram of radiation is turned and would assume form $h$—1 or $h$—2 according to which group has a phase lead, and the main vectors $v$—1, $v$—2 thereof will no longer be at right angles to the antenna surface. Such a phase shift may be obtained, for instance, by means of providing a by-pass lead $u$ in one of the feeders $e$—2. If, then, the said by-pass $u$ is rhythmically short-circuited by means of the switch $s$ then the beam will change between the form $h$ and $h\text{—}1$ thereby marking a guide line L. The preferable plan is to insert in both of the said feeder leads $e\text{—}1$, $e\text{—}2$ a similar by-pass lead $u$ (shown by dotted line in the drawing) which are alternately short-circuited. In this case the diagram changes from the end positions $h\text{—}1$ and $h\text{—}2$ and forms a guide line which coincides with the original direction of vector $v$. Fundamentally speaking, with two such transmitter arrangements each one of which comprises only one antenna it would be possible to fix two guide lines.

According to a further object of this invention, a further simplification is obtained by employing only a single arrangement according to Fig. 2. In the use of this scheme one could first proceed in such a way that alternately by superposition of radiations $h$ and $h\text{—}1$ the two guide lines L and $L^1$ are fixed. The change from L to $L^1$ may be accomplished at supersonic frequency so that the different signal sequences as such will not be interrupted so far as the indicators and the ear are concerned. Where the change is effected at a rapid rate, recourse may be had to electron switches and cathode ray or glow tube relays instead of contact type switches.

Another solution consists in that by the aid of the radiator arrangement only a single guide line or $v$ is marked by electric circuit changes, while the entire radiator system is oscillated mechanically about an axis to be imagined at right angles to the plane through the drawing. Antennae designed for forming a guide beam need not be concentrated too sharply so that the size thereof, when using ultra-short waves and more particularly decimeter or centimeter waves can be made rather small. As a result, mechanical oscillating of the radiator system is attended with no difficulties. Also in this case the rhythm or rate at which the change-over or signal sequence takes place is so chosen that not only each of the two guide lines is clearly distinguishable, but in addition it is also possible to tell whether a receiver is positioned between the two guide lines and therefore inside the course-bearing or sector, or outside the same, and, in the latter case upon which side thereof.

The arrangement may even be used in a manifold manner for marking a plurality of sectors such that the radiator arrangement is oscillated intermittently whereby several guide lines are fixed in space. By changing the identification signal (keying rhythm or modulation frequency) these different guide lines may be distinguished from one another. It will be understood that an arrangement as described may be used to advantage also if the direction of the guide ray itself serves for marking a course of travel rather than the sectors enclosed by the guide lines.

The practical utility and value of an arrangement as herein disclosed inheres not only in its great simplicity, but above all in the fact that it is possible to mark sectors of any desired narrowness. While ordinarily radiator arrangements of practically inacceptable size would have to be provided as soon as a beam amounting to only a few degrees is required, it is now possible to provide sectors of an order of angular magnitude as actually required in navigation. In other words, an arrangement according to this invention is capable of providing a perfect substitute for optical signals used to mark a lane of travel. Another advantage which may also be regarded as essential consists in the great adaptability of the present arrangement. It is known that in marine work traveling sectors or channels having all kinds of angles are met with in practice. Hence for each such opening angle a distinct radiator arrangement would have to be designed if an attempt were made to mark these sectors by an absolute concentration of the radiations into beams. By means of the present invention only a single radiator type is required, in fact, this single type could be adapted to any case by changing the angle of aperture of the guide ray.

What I claim is:

1. In a radio transmitting system, the method of operation which includes the steps of radiating two beams of waves in the same general direction, which have overlapping radiation patterns, changing the direction of radiation of one of said beams to obtain a smaller section of overlapping patterns, restoring the directions of radiation of said two beams, and then changing the direction of radiation of the other beam in an opposite direction also to obtain a smaller section of overlapping patterns, whereby there are obtained two guide lines which define the boundaries of a desired angle.

2. In a radio transmitting system, the method of operation which includes the steps of radiating two beams of waves which have overlapping radiation patterns, changing the direction of one of said beams first in one direction and then in an opposite direction with respect to the main direction of said other beam, whereby there are obtained two guide lines which define the boundaries of a desired angle.

3. A transmitting antenna system comprising a first antenna and a second antenna, high frequency apparatus, an energy feed line from each of said first and second antennas to said high frequency apparatus, and a switch in each of said feed lines operative in one position to short circuit a portion of said line in which it is located, said feed lines being of substantially equal length to the flow of energy between said antennas and said high frequency apparatus when said switches are both positioned to short circuit a portion of their respective lines.

WILHELM RUNGE.